United States Patent [19]

Walker

[11] Patent Number: 5,533,793
[45] Date of Patent: Jul. 9, 1996

[54] AGRICULTURAL TIRES AND WHEEL ASSEMBLIES THEREFORE

[75] Inventor: Perry Walker, Dunlap, Ill.

[73] Assignee: Gleason Corporation, Los Angeles, Calif.

[21] Appl. No.: 431,860

[22] Filed: May 1, 1995

Related U.S. Application Data

[63] Continuation of Ser. No. 406,045, Mar. 17, 1995.

[51] Int. Cl.⁶ ........................................ B60B 3/08
[52] U.S. Cl. ........................ 301/64.4; 301/64.7; 152/454
[58] Field of Search ........................ 152/209 A, 209 WT, 152/454, 382, 387, 323, 324, 327, 328, 329; 301/63.1, 64.2, 64.3, 64.4, 64.5, 64.7

[56] References Cited

U.S. PATENT DOCUMENTS

| | | | |
|---|---|---|---|
| 1,340,199 | 5/1920 | Williams | 152/454 X |
| 1,623,645 | 4/1927 | Van Daam | 301/64.4 |
| 1,662,944 | 3/1928 | Werra et al. | 301/64.4 |
| 2,848,278 | 8/1958 | Todd | 301/64.4 |
| 3,214,220 | 10/1965 | Foster et al. | 301/64.7 X |
| 3,450,182 | 6/1969 | Verdier | 152/209 WT X |
| 4,449,756 | 5/1984 | Weeks | 301/64.7 X |
| 4,467,852 | 8/1984 | Ippen et al. | 152/327 X |
| 4,733,730 | 3/1988 | Murray | 152/327 X |
| 5,251,965 | 10/1993 | Johnson | 301/64.3 |

FOREIGN PATENT DOCUMENTS

| | | | |
|---|---|---|---|
| 292698 | 1/1932 | Italy | 301/64.4 |
| 0082402 | 5/1985 | Japan | 301/64.7 |

OTHER PUBLICATIONS

Ace Products, Inc. catalogue "Agricultural Tires for all Applications", undated, admitted prior art.

*Primary Examiner*—Russell D. Stormer
*Attorney, Agent, or Firm*—Edward J. DaRin

[57] ABSTRACT

An agricultural wheel assembly constructed of a plastic wheel half and a metal half releasably secured together for use with agricultural row crop planters and grain drills. The plastic wheel half has a smooth flat or shallow cup for eliminating the problems related to "rooster tailing". The metal wheel half having a deep cut configuration for clearance when mounted on the agricultural equipment and exhibiting structural strength above and beyond that of the plastic wheel half. The wheel halves are releasably but tightly locked together. An improved clincher base tire for the plastic-metal wheel assembly having an offset tire lip for depth/gauge control and a base having a dependent nose adapted to be snugly received at the juncture of the wheel halves for substantially eliminating soil infiltration between the tire and the wheel assembly when mounted on the plastic half.

16 Claims, 4 Drawing Sheets

AGRICULTURAL TIRES AND WHEEL ASSEMBLIES THEREFORE

This is a continuation of application Ser. No. 406,045 filed Mar. 17, 1995.

FIELD OF INVENTIONS

This invention relates to agricultural wheels and tires therefore for use with row crop planters and grain drills.

BACKGROUND OF INVENTION

Agricultural wheel assembies and pneumatic tires therefore are presently known in the art. At the present time, agricultural wheel assemblies are constructed and assembled from metal wheel halves or nylon plastic wheel halves along with various configurations of agricultural tires for press wheel and gauge wheel applications. Press wheels are generally situated behind a planter's drill head for pressing the soil down over newly planted seeds. This requires a flexible tire. Gauge wheels are used on planters and grain drills for regulating the soil penetration depth of the opener blades and require a flexible tire tread. When deep cup wheel assemblies are used, a special bulldozing problem results when soil builds up in front of and on the deep cup wheel assemblies, characteristic of present day metal wheels, causing the wheel to slow down.

Another planting problem that results from the current design and construction of agricultural wheel assemblies is plant emergence variability. Soil builds up on the deep cup of the current agricultural wheel assembly and as the wheel turns, the accumulated soil is thrown to the adjacent row. This process is known as "Rooster Tailing". Since the adjacent row has either been previously planted or drilled, the excess soil thrown thereon causes seed-to-soil contact variability. A new study released by Purdue University indicates that seed-to-soil contact variability can result in plant emergence variability, delayed germination or no plant penetration, causing a reduction in crop yields by 6% to 22%.

In addition to the soil build up occuring on the wheel assembly, soil accumulates on the crop planter. As a result, efficiency and productivity of the planter can be adversely affected Air pollution is another problem caused by the current agricultural wheel assemblies. As the soil is thrown into the air with each revolution of the wheel, herbicides and insecticides applied by the farmers on their fields become airborne as well. This not only contaminates the air, but increases the amount of herbicides and insecticides used by the farmers to replace what has blown away. This action also contributes to top soil erosion which occurs naturally from the winds.

With the introduction of all nylon wheel assemblies, the Rooster Tailing and the problems resulting therefrom have been substantially eliminated. The nylon wheels do not permit the soil to build up on them, thereby reducing the risk of seed-to-soil contact variability, planter inefficiency, air pollution and increased herbicide and insecticide costs. The nylon wheel are formed with shallow cups to overcome these aforementioned problems and are preferred by the farmers and for the environment. At the present time there is no known two piece wheel solution to the "Rooster Tailing" problems associated with 4½ inches by 16 inches gauge wheels used on row crop planters and grain drills. In these applications the front wheels are commonly mounted at an angle to the direction of movement of the planter and the all plastic wheel does not have sufficient structural integrity for use in these applications. In addition, an agricultural tire mounted on the wheel assemblies are always under side pressure and may result in dirt infiltration under the tire and create a premature failure of the wheel assembly. This may occur when the machinery is used on a hillside or turns in a field. Therefore,there is a present day need for an improved wheel assembly and tire for use on row crop planters and minimum tillage grain drills that avoids the aforementioned problems.

SUMMARY OF INVENTION

The present invention substantially eliminates the problems associated with unintended soil movement prevalent with present day wheel assemblies used on row crop planters and grain drills and the problems associated with dirt infiltration between the tires and wheel assemblies through the use of a novel and improved clincher base agricultural tire for the novel and improved wheel assemblies. The present invention comprehends the provision of a 4½ inch× 16 inch wheel and tire assembly wherein the outside wheel half is constructed as a low cup or substantially flat nylon plastic wheel half assembled and secured to a metal, deep cup wheel half on the inside of the wheel when mounted with the aforementioned types of agricultural equipment. The improved clincher base tire is adapted for securely mounting on the nylon plastic wheel half and includes a nose for closely mounting to the outside juncture of the nylon plastic and metal or metal composite wheel halves for substantially eliminating the problems due to dirt infiltration under the tire. The nylon plastic metal wheel assembly is also designed and configured to accomodate standard base tires on the metal half of the wheel assembly. The metal half of the wheel assembly provides sufficient clearance for the mounting arm of the equipment and any scraper mounted thereon.

The nylon plastic wheel half is designed with an integral hub providing a full length bearing support thereby reducing wobble and providing longer bearing life and more accurate adjustment to the agricultural equipment. In this manner a bearing can be firmly press fit into the hub for positive holding thereof. The two wheel halves can be securely bolted together and locked with the bolts and coaxial, bolt holes extending through each wheel half thereby preventing wheel movement under side loads and increasing the shock absorbency thereof.

BRIEF DESCRIPTION OF DRAWINGS

These and other features of the present invention may be fully appreciated when considered in the light of the following specification and drawings, in which.

DETAILED DESCRIPTION OF THE PREFERRED EMBODIMENT (BEST MODE) OF THE INVENTION

Figure 1:
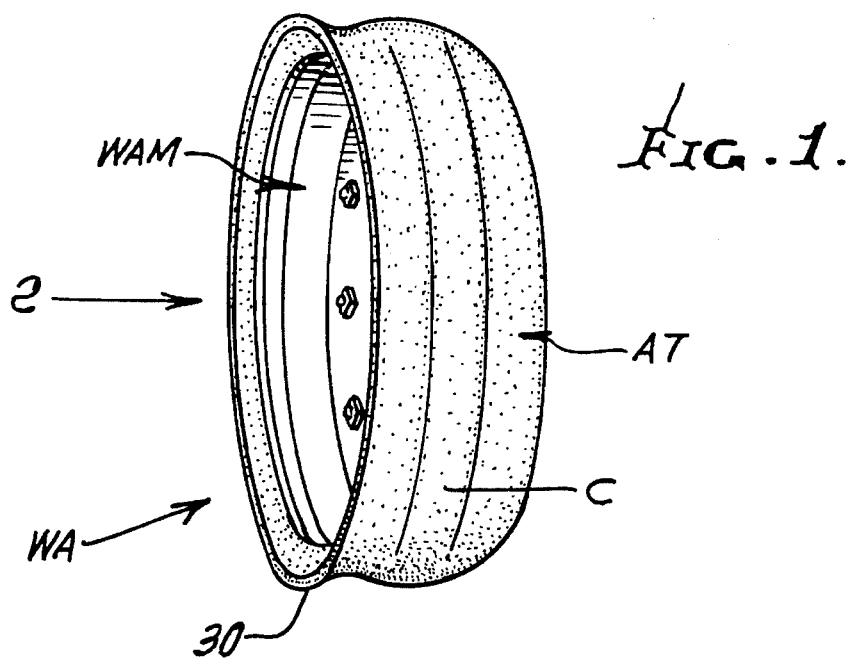
FIG. 1 is a side elevational view of the wheel assembly and tire for agricultural equipment embodying the present invention.
Figure 2:
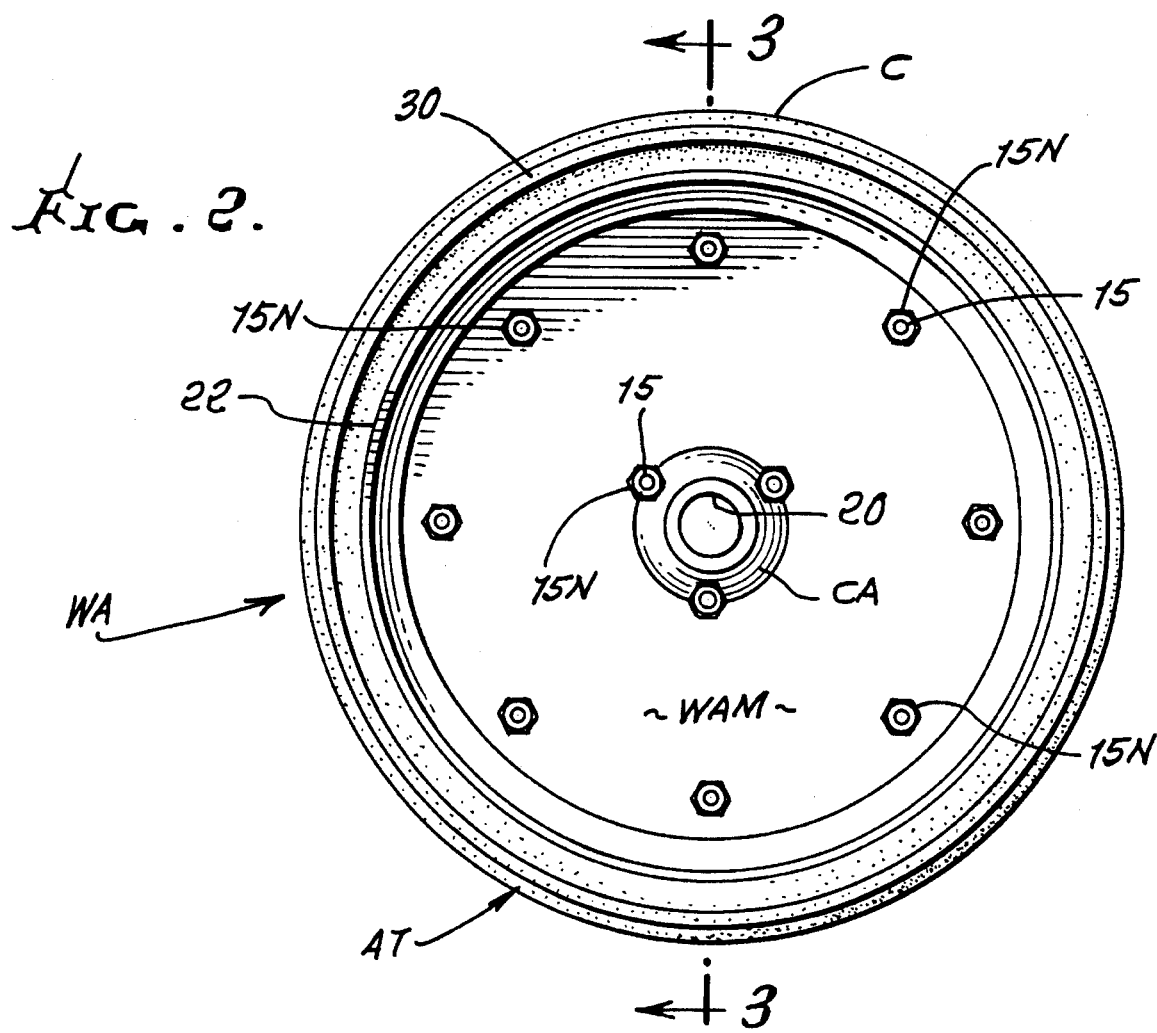
FIG. 2 is a side elevational view from side "2" of FIG. 1.

Now referring to the drawings, the presently preferred embodiment of the improved wheel assembly WA and improved agricultural tire AT for use with row crop planters and grain drills will be described in detail.

The improved wheel assembly WA will first be examined. The wheel halves can be best appreciated from examining FIGS. 3–5. As illustrated in the drawings, the wheel halves comprise a nylon plastic wheel half WAP illustrated on the right hand sides of FIGS. 3 & 5, with left hand sides of the wheel assembly WA constructed as a deep dish or concave metal or metal composite wheel half WAM, preferably of steel. These wheel halves WAP & WAM are tightly secured together for providing a wheel assembly that is 4 inches×16 inches in overall dimensions. The plastic wheel half WAP is configured with a shallow, smooth cup or flat, smooth outer side so that when mounted to the aforementioned types of agricultural equipment for reducing the amount of soil thrown into the air during cultivation. This plastic wheel half has a central aperture 10 including a full length, circular bearing hub H extending outwardly from the opposite side thereof for providing a more stable bed for a bearing than prior art bearing beds including when a steel or other metal wheels are utilized. The outer periphery of the back side of the wheel half WAP is provided with a peripheral clinching ring CR to grip a clincher base tire; see FIGS. 3 & 5.

Figure 3:
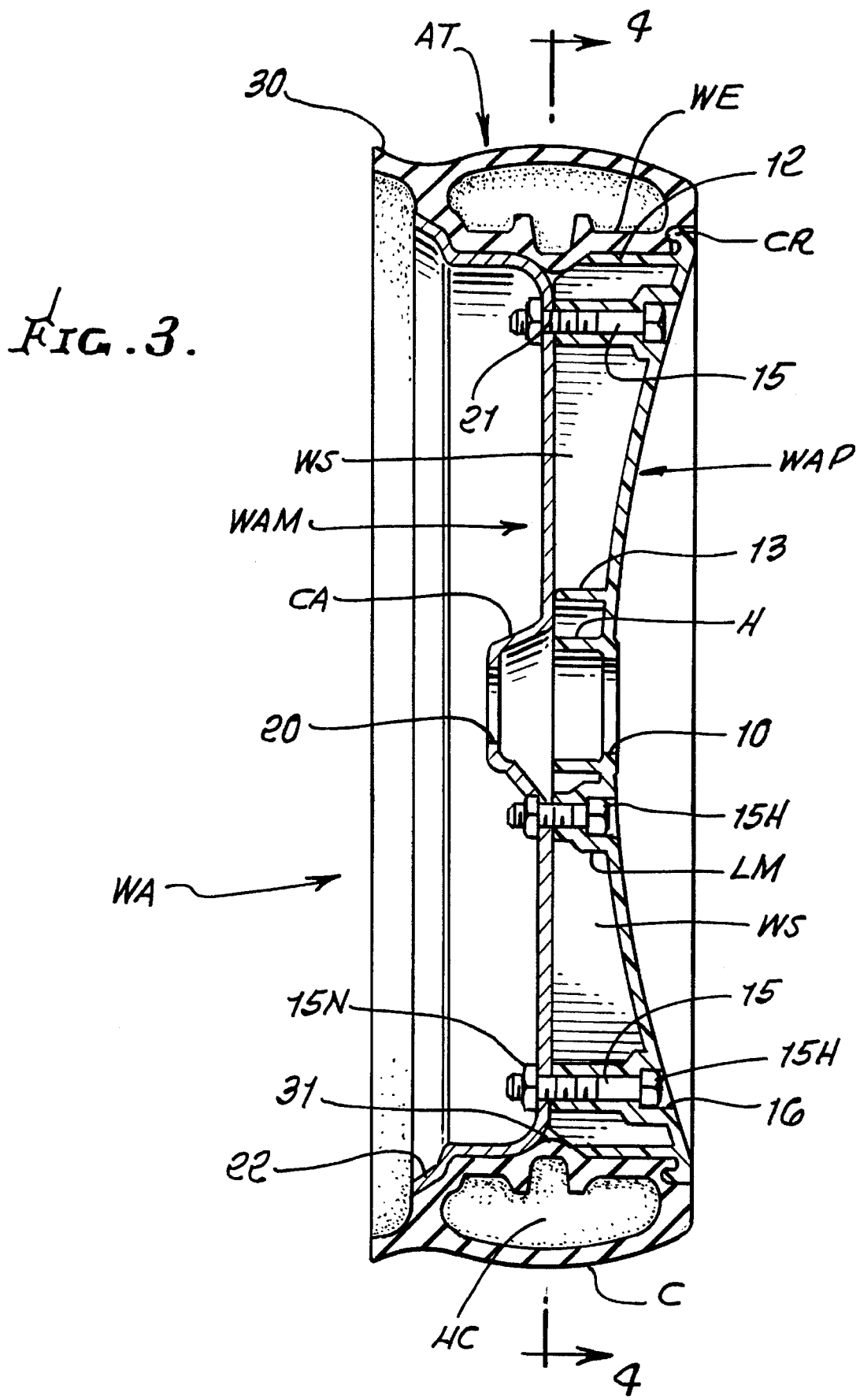
FIG. 3 is a cross-sectional view taken along the line 3—3 of FIG. 2.
Figure 4:
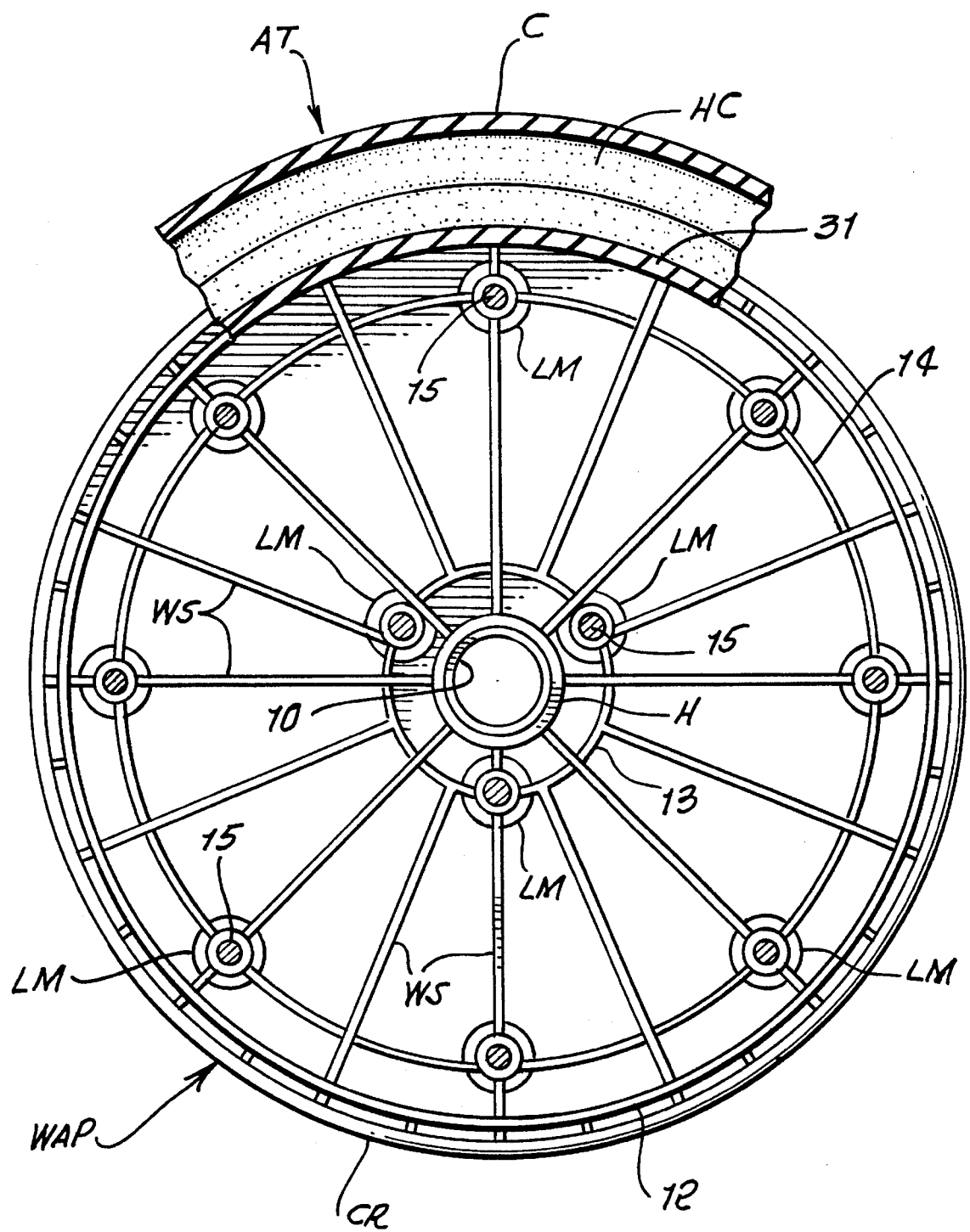
FIG. 4 is a view taken along the line 4—4 of FIG. 3, with the major portion of the tire broken away.

The back side of the plastic wheel half is formed with a flat sided, tire mounting ring 12 of a preselected dimension, extending outwardly therefrom for mounting the flat base of an agricultural tire and preferably the improved agricultural clincher base tire AT. The plastic wheel half is strenghtened by the provision of a webbing structure WS extending from the hub 10 to base of tire mounting ring 12; see FIG. 4. This webbing structure WS adds strength to the wheel half WAP and thereby the wheel assembly WA by transferring load shock from the outer wheel area to the stronger hub area whereby the shock load resistance is increased. The webbing structure includes a ring 13 coaxial with the bearing hub H spaced outwardly thereof and in essentially the same outer plane of the webbing structure WS, as best illustrated in FIG. 4. The ring 13 includes a preselected number of apertured, locking bolt mounts LM for receiving locking bolts therein; three equally spaced mounts LM are illustrated in the drawings. A second ring 14 is defined intermediate the ring 13 and the tire mounting ring 12, as illustrated, closely adjacent the hub area that is also provided with a preselected number of apertured locking bolt mounts LM, equally spaced around the ring 14. Eight mounts LM are illustrated in FIG. 4, spaced adjacent to the ring 12. The front side of the wheel half has recessed apertures 16 coaxial with the mounts LM. The bolt apertures are sized to permit the wheel assembler to press the threaded bolts 15 in place on the mounts LM with the bolt heads 15H held in the recessed apertures 16; see FIG. 3. It should be noted that these strengthening elements of the webbing structure WS extend from the ring 12 to the hub H for those elements including the locking mounts LM. The other strengthening elements of the structure WS extend through the ring 14 to the ring 13 and are spaced between the bolt mounts LM.

The metal wheel half WAM is shaped with a deep cup configuration and an outwardly extending, integral C-like shaped, central area CA. The central area CA has a central aperture 20 defined to be coaxial with the hub H for the plastic wheel half WAP when assembled in a side by side relationship, as best illustrated in FIG. 3 for receiving the end of wheel bearing (not shown) mounted in the hub H. Similarly, bolt receiving apertures 21 are equally spaced apart on the wheel half WAM defined to receive the threaded ends of the bolts 15 when the wheel halves are arranged in a side by side relationship for securement together. The two wheel halves WAP & WAM are tightly secured together by the provisions of nuts 15N mounted onto the metal wheel half WAM.

It should be noted that when the wheel assemblies mounted on the type of agricultural equipment of the type under consideration, roll down a farmer's field, the pressure to one edge of the wheel could cause the wheel halves to move relative to one another. The locking of the bolt holes on the two wheel halves, as described hereinabove, prevents this type of undesirable movement and increases the shock absorbency as the shock loads are transferred throughout the wheel. The above described bolt head mounting not only permits the wheel assembler to press the bolts 15 in place but also permits the nuts 15N to be torqued onto the bolts 15, without the need for the assembler to hold the bolt heads 15H from rotation and giving a more accurate torquing.

The outer periphery of the metal wheel half WAM is formed with a preselected, outwardly extending portion 22 to mate with the inner shape of an agricultural tire mounted thereon. The illustrated shape at 22 extends angularly outwardly from the sidewalls of the cup shaped half WAM. Although a unique clincher base tire of the type to be described hereinafter is preferred, a standard agricultural tire may be mounted on the metal wheel half WAM. The assembled, tightly secured wheel halves are best seen in FIG. 3. The preferred materials for constructing the plastic wheel half WAP is a tough, glass-filled nylon with a smooth, low energy wheel surface for resisting soil build up, and will not rust, is chemical resistant without the need for painting and of the type available from the Ace Products division of the Gleason Corporation of Los Angeles, Calif. The metal wheel half WAM is preferably constructed of steel but may be constructed of a metal composite having the structural strength of steel. When the wheel assembly WA described hereinabove is mounted on the above mentioned types of agricultural equipment, the plastic wheel half is mounted to the outside of the equipment and the metal half on the inside thereof for providing the necessary structural strength not possessed by a plastic wheel half particularly when the wheel assembly is at an angle to the path of movement of the agricultural equipment. The deep cup provided by the metal wheel half WAM advantageously maintains the wheel fit on its mounting arm resulting in wheel clearance for the equipment's scraper attachment and wheel mounting arm. The bolted wheel halves of the present invention permits easy disassembly thereof for the replacement of any failed parts.

Now referring in particular to FIGS. 3 & 5, the improved, clincher base tire AT of the present invention for use with the aforementioned type of wheel assembly WA as a gauge wheel will be described. The clincher base agriculural tire AT is formed with a smooth crown with an offset lip 30 and nose 31 intermediate its sidewalls for substantially mating with the cavity defined at the juncture of the two wheel halves; see FIG. 3 in particular. The tire AT is a semi-pneumatic tire, that is puncture proof and needs no inflation and is constructed of rubber compounds of the quality of the agricultural tires presently available from the Ace Products Division of the Gleason Corporation. The offset lip 30 is approximately one-half inch in length so as to extend beyond the wheel assembly WA and the preferable size for the tire is 4½ by 16 inches, as will be described. The offset tire lip shoulder aids the prevention of soil collapsing seed walls during planting.

Figure 5:
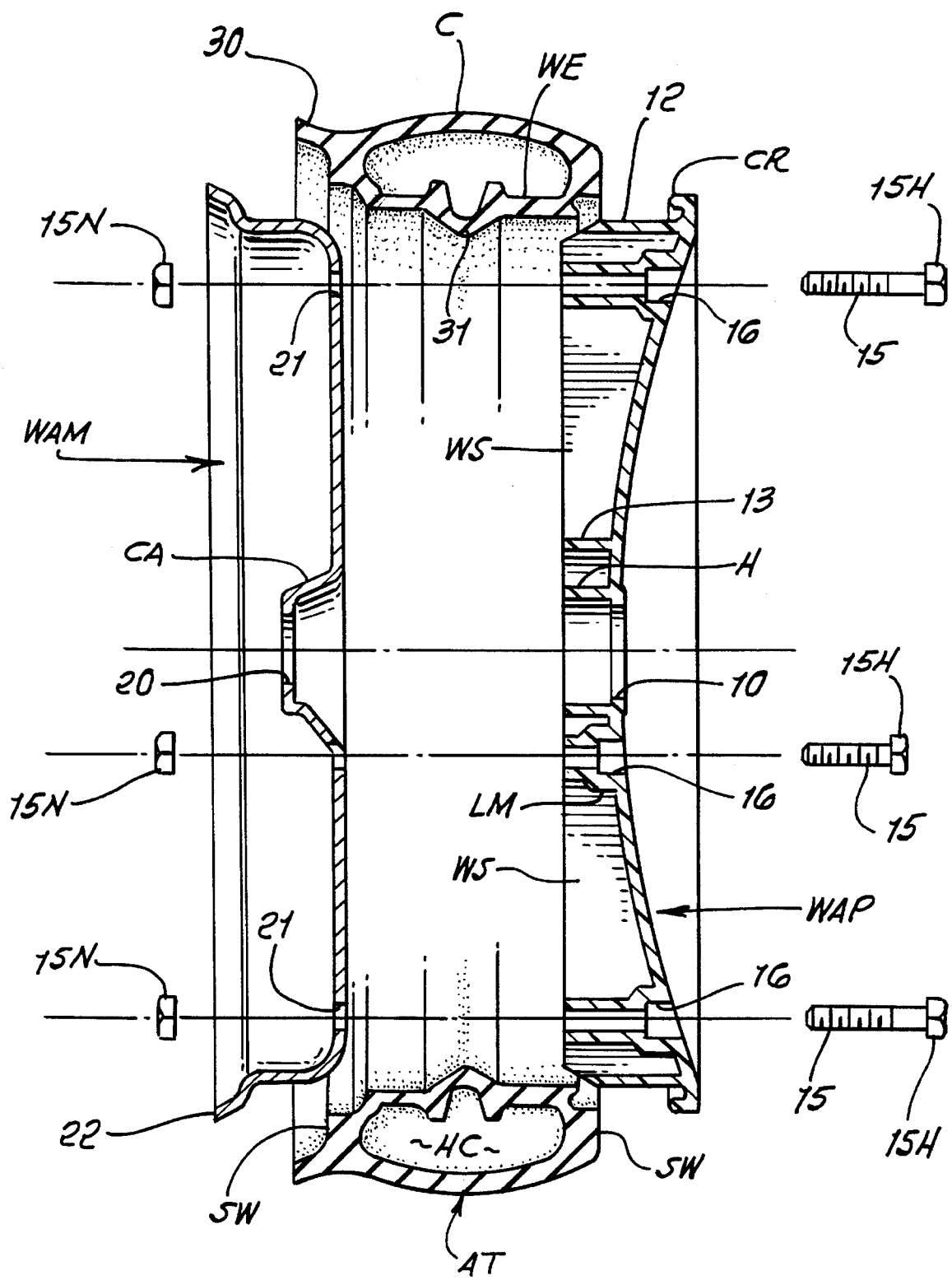
FIG. 5 is a sectional view of the agricultural tire of the present invention with the wheel halves and fastening means illustrated in an exploded relationship therewith.

The tire AT, as best seen in cross-section, has a smooth outer crown C with one side, the left hand side as seen in FIG. 5, merging smoothly with the offset lip 30 protruding outwardly from the tire proper. The sidewalls SW of the tire AT are flat and dependent from the crown C. The left hand sidewall SW is formed to smoothly merge with the solid rubber lip 30 as illustrated. The bottom portion of the left hand side wall is shaped to closely mate with the outside configuration of metal wheel half WAM at the corners thereof; see FIG. 3. The bases of the sidewalls SW merge with a wheel engaging surface WE extending between the sidewalls. The right hand sidewall base is provided with a clinching undercut for clinchingly mating with the clinching ring CR for the plastic wheel half WAP; as illustrated.

The wheel engaging surface WE, in accordance with the present invention, is provided with a downwardly protruding nose 31, in this instance, to tightly fit a cavity formed on the outside juncture of the two wheel halves as best seen in in FIG. 3, thereby eliminating the infiltration of dirt between the tire AT and the wheel assembly WA that results in the premature failure of the wheel assembly WA. This is most likely to occur when the associated agricultural equipment turns in the fields or is used on a hillside. Since the wheel WA is commonly mounted at an angle so that the clincher base is always under pressure.

The nose 31 is of solid rubber with a substantially U configuration with the arms of the U extending outwardly of the top of the surface WE. The inner walls of the crown C, sidewalls SW and surface WE form a hollow closed chamber HC. The top ends of the arms of the U-shaped nose 31 terminate within the hollow chamber HC. This clincher tire AT with offset lip as described is more advantageous than present day, commercially available agricultural clincher tires. The provision of the closed chamber HC renders the crown C flexible.

It should now be seen by those skilled in the art that the present specification has taught the art an improved wheel assembly and described clincher tire that may be used as a gauge wheel for crop row planters and drills that not only improves the environment but also the crop yields. It should now be apparent that the problem of "rooster tailing" for the aforementioned pieces of agricultural equipment has now been solved.

I claim:

1. An agricultural wheel assembly for use with agricultural row crop planting machinery and grain drills, said wheel assembly comprising a molded plastic wheel half and a metal wheel half adapted to be assembled and secured in a side by side relationship, said plastic wheel half having a shallow cup wheel half on one side thereof for substantially eliminating soil build up on said one side of said wheel half and a central opening having a hub means extending axially outwardly from the other side of said wheel half a preselected distance for forming a substantially full length wheel bearing support, said other side of said plastic wheel half having a tire mounting peripheral lip extending radially outwardly thereof for clinching engagement with the outer sidewall of a tire base mounted on said wheel half and a concentric tire mounting ring molded adjacent said lip and extending a preselected axial distance outwardly thereof for receiving and mounting a tire base thereon, webbing means extending radially between said hub means and said tire mounting ring for strengthening said plastic wheel half for transferring any load shock from said tire mounting ring to said hub means, said metal wheel half having one side formed with a substantially deep cup configuration on one side thereof and substantially flat configuration on the opposite side thereof for abutting engagement with said webbing means of said plastic wheel half when said wheel halves are assembled and secured in a side by side relationship, said metal wheel half including integrally formed, centrally apertured hub extending axially outwardly of said flat side to be coaxial with said plastic hub means when mounted and secured in a side by side relationship with said plastic wheel half, said metal wheel half having sidewalls extending radially outwardly and being defined to closely mate with the configuration of a tire base mountable on said metal sidewalls on said secured wheel halves, and releasable fastening means secured to said wheelhalves in a manner to prevent wheel movement under side loads subjected to the wheel assembly.

2. An agricultural wheel assembly as defined in claim 1 wherein said fastening means comprises a plurality of bolt holes for said plastic wheel half and said metal wheel half when coaxially arranged for locking said wheel halves together by means of fasteners mounted in said bolt holes.

3. An agricultural wheel assembly as defined in claim 1 wherein said metal wheel half is constructed of a preselected steel and said plastic wheel half is constructed of a preselected, glass-filled nylon.

4. A wheel assembly for use with agricultural machinery such as row crop planting machinery and grain drills for reducing the amount of soil thrown into the air in the use on said machines, said wheel assembly comprising a molded plastic wheel half having one side thereof constructed and defined with a shallow side for preventing the build up of soil on said one side when utilized on one of said preselected agricultural machinery, the opposite side of said plastic wheel half being molded with a circumferential tire mounting clinching lip defined thereon and a flat, tire mounting ring for receiving and mounting the base of a tire thereon and a central aperture extending through said wheel half, a bearing hub coaxially surrounding said aperture and extending axially outwardly of said opposite side of said wheel half for providing a substantially full length bearing retention for said wheel assembly, and means for reinforcing said plastic wheel half constructed and defined integrally with said opposite side of said wheel half, and extending from said hub to the base of said tire mounting ring for transferring any load shock from said tire mounting ring to said hub, a metal wheel half adapted to be assembled and secured in a side by side relationship with said said plastic wheel half, said metal wheel half having an integral cup shaped configuration having a substantially flat side with sidewalls and a central aperture defined to be coaxial with said bearing hub for said plastic wheel half when said flat side is mounted in abutting relationship with said opposite side of said plastic wheel half, said cup sidewalls having a preselected configuration corresponding to the configuration of a preselected tire for mating with the tire when mounted on said wheel assembly, and fastening means for securely and releasably locking said wheel halves together in a manner for preventing wheel movement under wheel side loads subjected to said wheel assembly.

5. A wheel assembly as defined in claim 4 wherein said plastic wheel half is molded from a preselected glass filled nylon having preselected strength useful for agricultural machinery.

6. A wheel assembly as defined in claim 4 or 5 including an agricultural, semi-pneumatic clincher tire mounted on said wheel assembly on said nylon wheel half.

7. A wheel assembly as defined in claim 4 wherein said metal wheel half is formed from metal having a preselected strength.

8. A wheel assembly as defined in claim 4 or 5 including an agricultural, clincher tire mounted on said plastic wheel half constructed and defined for substantially eliminating the infiltration of dirt under said tire.

9. A wheel assembly as defined in claim 4 or 5 including an agricultural, semi-pneumatic clincher tire mounted on said plastic wheel half and including a clincher nose configured for mating to said wheel halves when butted and secured together to thereby substantially eliminate the infiltration of soil, dirt and the like between said tire and said wheel assembly leading to a longer, useful life for said wheel assembly.

10. A wheel assembly as claimed in claim 4 wherein said metal wheel half is formed from a metallic composite.

11. A wheel assembly as claimed in claim 4 wherein a standard agricultural base tire is mounted on said metal wheel half.

12. A wheel assembly as defined in claim 9 wherein said clincher tire includes a circumferential, offset tire lip shoulder extending radially outwardly of one sidewall at a preselected angle and thereby extends outwardly of said wheel assembly from said metal wheel half when used as a gauge wheel for regulating the soil penetration depth.

13. An agricultural, semi-pneumatic tire for use with agricultural machinery utilizing wheel assemblies comprising a plastic wheel half and a metal wheel half assembled and secured together, the plastic wheel half having a substantially flat configuration on one side of said wheel assembly and a peripheral clinching ring means defined to extend axially inwardly of said flat side and a metal wheel half having an integral cup shaped configuration on the opposite side of said wheel assembly from said one side thereof, said tire having a smooth outer crown and straight sidewalls integral with said crown and further constructed and defined with a clincher base having an undercut for tightly engaging said peripheral clinching ring means for said plastic wheel half and gripping said wheel half at said clinching ring means, said clincher base being further characterized as having a clincher nose dependent from said base intermediate said sidewalls and arranged and sized for tightly engaging said wheel assembly between the outer peripheral junction of said wheel halves, the remaining portion of said tire base being configured for mating with said wheel halves whereby dirt infiltration between said clincher tire base and said wheel assembly is substantially eliminated, said inner walls of said crown, sidewalls and base including the clinching nose being shaped to define a hollow chamber for said tire.

14. An agricultural, semi-pneumatic tire as defined in claim 13 wherein said clinching nose has an inner wall cross-sectional configuration defining a "U" extending into said chamber.

15. An agricultural, semi-pneumatic tire for use with agricultural row crop planters or grain drills, said tire having an outer configuration constructed and defined with a smooth crown and straight sidewalls with one of the sidewalls having an offset tire lip shoulder extending axially outwardly of said one sidewall at a preselected angle and extending a preselected distance beyond a mounting wheel assembly for contacting the soil and a peripheral clincher base for firmly holding said tire to a wheel assembly having peripheral clincher means to be held thereat, said base including a dependent nose portion defined intermediate said straight sidewalls whereby said thus defined clincher base substantially eliminates dirt infiltration under the tire when mounted to a wheel assembly and thereby substantially eliminating the premature failure of the wheel assembly when the clincher base is mounted to the clincher means and said nose portion is snugly received at the juncture of the wheel assembly halves, said inner walls of the crown, sidewalls, dependent nose and said clincher base being constructed and shaped for defining a hollow chamber.

16. An agricultural tire as defined in claim 15 wherein said tire lip extends outwardly approximatley one-half inch of a wheel assembly when mounted thereon.

* * * * *